United States Patent
Gill (10) Patent No.: US 6,819,530 B2
(45) Date of Patent: Nov. 16, 2004

(54) CURRENT PERPENDICULAR TO THE PLANES (CPP) SENSOR WITH FREE LAYER STABILIZED BY CURRENT FIELD

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 10/256,114

(22) Filed: Sep. 25, 2002

(65) Prior Publication Data

US 2004/0057162 A1 Mar. 25, 2004

(51) Int. Cl.[7] ............................................. G11B 5/39
(52) U.S. Cl. ................. 360/314; 360/322; 360/324.12; 360/324.2
(58) Field of Search ........................... 360/324.2, 314, 360/322, 324.12

(56) References Cited

U.S. PATENT DOCUMENTS

| | | | |
|---|---|---|---|
| 5,828,530 A | 10/1998 | Gill et al. | 360/113 |
| 5,898,547 A | 4/1999 | Fontana, Jr. et al. | 360/113 |
| 5,898,548 A | 4/1999 | Dill et al. | 360/113 |
| 5,901,018 A | 5/1999 | Fontana, Jr. et al. | 360/104 |
| 6,061,210 A | 5/2000 | Gill | 360/113 |
| 6,097,579 A | 8/2000 | Gill | 360/324.2 |
| 6,114,719 A | 9/2000 | Dill et al. | 257/295 |
| 6,120,920 A | 9/2000 | Takada et al. | 428/693 |
| 6,125,009 A | 9/2000 | Ishiwata et al. | 360/113 |
| 6,185,078 B1 | 2/2001 | Lin et al. | 360/324.12 |
| 6,185,079 B1 | 2/2001 | Gill | 360/324.2 |
| 6,185,080 B1 | 2/2001 | Gill | 360/324.2 |
| 6,256,178 B1 * | 7/2001 | Gill | 360/324.2 |
| 6,271,997 B1 | 8/2001 | Gill | 360/314 |
| 6,275,363 B1 | 8/2001 | Gill | 360/324.2 |
| 6,295,187 B1 | 9/2001 | Pinarbasi | 360/324.11 |
| 6,466,419 B1 * | 10/2002 | Mao | 360/324.12 |
| 6,542,340 B1 * | 4/2003 | Hayashi | 360/322 |
| 6,580,587 B1 * | 6/2003 | Everitt | 360/324 |

* cited by examiner

Primary Examiner—Craig A. Renner
(74) Attorney, Agent, or Firm—Ervin F. Johnston (57) ABSTRACT

A magnetic head assembly includes a first lead that is electrically connected to a CPP sensor for conducting a current through the sensor perpendicular to major planes of the layers of the sensor. A second lead extends from a stripe height of the sensor into the head assembly. A nonmagnetic electrically conductive bias layer, which has major planes that are parallel to the major planes of the sensor, is electrically connected to the sensor and the second lead so that when the current flows through the bias layer parallel to the major planes of the bias layer and perpendicular to a head surface of the CPP sensor a free layer of the sensor is biased by the bias layer.

21 Claims, 9 Drawing Sheets

CURRENT PERPENDICULAR TO THE PLANES (CPP) SENSOR WITH FREE LAYER STABILIZED BY CURRENT FIELD

CROSS REFERENCE TO A RELATED PATENT

This application is related to commonly assigned U.S. Pat. No. 6,185,079 B1, which is incorporated by reference herein.

BACKGROUND OF THE INVENTION

1. Field of the Invention

The present invention relates to a current perpendicular to the planes (CPP) sensor wherein a current flowing through a conductive bias layer next to a free layer in the sensor stabilizes the free layer by a current field acting on the free layer.

2. Description of the Related Art

The heart of a computer is typically a magnetic disk drive which includes a rotating magnetic disk, a slider that has write and read heads, a suspension arm above the rotating disk and an actuator arm. The suspension arm biases the slider into contact with a parking ramp or the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a current perpendicular to the planes (CPP) sensor for sensing the magnetic field signals from the rotating magnetic disk. The sensor includes a nonmagnetic electrically conductive or electrically nonconductive material spacer layer sandwiched between a ferromagnetic pinned layer and a ferromagnetic free layer. An antiferromagnetic pinning layer typically interfaces the pinned layer for pinning the magnetic moment of the pinned layer 90° to an air bearing surface (ABS) wherein the ABS is an exposed surface of the sensor that faces the rotating disk. The sensor is located between ferromagnetic first and second shield layers. First and second leads are connected to a bottom and a top respectively of the sensor for conducting a current perpendicular to the major thin film planes (CPP) of the sensor. This is in contrast to a CIP sensor where the current is conducted in plane parallel to the major thin film planes (CIP) of the sensor. A magnetic moment of the free layer is free to rotate upwardly and downwardly with respect to the ABS from a quiescent or zero bias point position in response to positive and negative magnetic field signals from the rotating magnetic disk. The quiescent position of the magnetic moment of the free layer, which is parallel to the ABS, is when the current is conducted through the sensor without magnetic field signals from the rotating magnetic disk.

When the aforementioned material spacer layer is nonmagnetic and electrically conductive, such as copper, the current is referred to as a sense current, but when the material spacer layer is nonmagnetic and electrically nonconductive, such as aluminum oxide, the current is referred to as a tunneling current. Hereinafter, the current is referred to as a current (I) which can be either a sense current or a tunneling current.

When the magnetic moments of the pinned and free layers are parallel with respect to one another the resistance of the sensor to the current (I) is at a minimum and when their magnetic moments are antiparallel the resistance of the sensor to the current (I) is at a maximum. Changes in resistance of the sensor is a function of cos θ, where θ is the angle between the magnetic moments of the pinned and free layers. When the current (I) is conducted through the sensor, resistance changes, due to field signals from the rotating magnetic disk, cause potential changes that are detected and processed as playback signals. The sensitivity of the sensor is quantified as magnetoresistive coefficient dr/R where dr is the change in resistance of the sensor from minimum resistance (magnetic moments of free and pinned layers parallel) to maximum resistance (magnetic moments of the free and pinned layers antiparallel) and R is the resistance of the sensor at minimum resistance.

Sensors are classified as a bottom sensor or a top sensor depending upon whether the pinned layer is located near the bottom of the sensor close to the first read gap layer or near the top of the sensor close to the second read gap layer. Sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel. Sensors are still further classified as single or dual wherein a single sensor employs only one pinned layer and a dual sensor employs two pinned layers with the free layer structure located therebetween.

The first and second shield layers may engage the bottom and the top respectively of the CPP sensor so that the first and second shield layers serve as the aforementioned leads for conducting the current through the sensor perpendicular to the major planes of the layers of the sensor. The read gap is the length of the sensor between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

It is important that the free layer be longitudinally biased parallel to the ABS and parallel to the major planes of the thin film layers of the sensor in order to magnetically stabilize the free layer. This is typically accomplished by first and second hard bias magnetic layers which abut first and second side surfaces of the spin valve sensor. Unfortunately, the magnetic field through the free layer between the first and second side surfaces is not uniform since a portion of the magnetization is lost in a central region of the free layer to the shield layers. This is especially troublesome when the track width of the sensor is submicron. End portions of the free layer abutting the hard bias layers are over-biased and become very stiff in their response to field signals from the rotating magnetic disk. The stiffened end portions can take up a large portion of the total length of a sub-micron sensor and can significantly reduce the amplitude of the sensor. It should be understood that a narrow track width is important for promoting the track width density of the read head. The more narrow the track width the greater the number of tracks that can be read per linear inch along a radius of the rotating magnetic disk. This further enables an increase in the magnetic storage capacity of the disk drive.

There is a strong-felt need to improve the biasing of the free layer and increase the magnetic storage of a disk drive.

SUMMARY OF THE INVENTION

The invention provides a CPP sensor which has a plurality of layers wherein the layers have major planes that are perpendicular to a head surface, such as the aforementioned ABS, and layers have a stripe height that extends normal to the head surface into the magnetic head assembly. The first lead is electrically connected to the sensor for conducting a current to the sensor perpendicular to the major planes of the layers and parallel to the head surface. The second lead extends from the stripe height into the head assembly. A nonmagnetic electrically conductive bias layer, which has major planes that are parallel to the major planes of the sensor, is electrically connected to the sensor and the second lead and is sized in width so that when a current flows through the bias layer parallel to the major planes of the bias layer and perpendicular to the head surface a free layer in the CPP sensor is properly biased. The CPP sensor and the bias layer are located between first and second shield layers with the bias layer being electrically insulated from the shield layers.

The bias layer preferably interfaces the free layer of the CPP sensor so that strong flux closure is implemented between the free layer and the bias layer. One of the shield layers, such as the first shield layer, is electrically connected to the CPP sensor and serves as a first lead for the current. Accordingly, the current can flow from the first shield into the CPP sensor perpendicular to the major thin film planes of the CPP sensor to the conductive bias layer, thence parallel to the major thin film planes of the conductive bias layer to the second lead which extends from the stripe height into the head assembly. The first and second leads are connected to processing circuitry which generates the current and detects potential changes upon the occurrence of field signals, which field signals constitute playback signals in the magnetic disk drive. The CPP sensor can be either a magnetic tunnel junction (MTJ) sensor or a CPP spin valve sensor. The conductive bias layer promotes a more uniform longitudinal magnetic field through the free layer which overcomes the aforementioned problems associated with the prior art hard bias layers at each side edge of the CPP sensor.

A preferred embodiment of the invention employs first and second CPP sensors where each CPP sensor has a ferromagnetic free layer with a magnetic moment which is oriented substantially parallel to the head surface and which is free to rotate in response to a signal field from a magnetic medium. Each free layer has major thin film planes that are perpendicular to the head surface and a stripe height that extends normal to the head surface into the head assembly. A nonmagnetic electrically conductive bias layer is located between the first and second CPP sensors and has major thin film planes that are parallel to the major thin film planes of the free layers of the CPP sensors and the bias layers extend in a direction away from the head surface into the head assembly beyond the stripe heights. The first and second CPP sensors and the bias layer are located between the first and second shield layers. The first and second shield layers are electrically connected to the first and second CPP sensors respectively for conducting first and second currents respectively through the sensor perpendicular to the major thin film planes of the free layers to the conductive bias layer. The conductive bias layer is electrically connected to the first and second CPP sensors and are sized so that the first and second currents can flow through the bias layer perpendicular to the head surface to cause a biasing field which biases the magnetic moments of the free layers antiparallel with respect to one another. This results in flux closure between the free layers of the first and second CPP sensors which promotes a very stable biasing condition. Again, the conductive bias layer preferably interfaces the free layers of the first and second CPP sensors.

In both embodiments the conductive bias layer may have a width at the head surface that is substantially equal to the width of the layers of the sensor at the head surface. Optionally, the conductive bias layer may have a width at the head surface that is greater than the width of the layers of the sensor at the head surface so that the strength of the biasing of the free layer or free layers is reduced. Accordingly, the width of the conductive bias layer may be sized so as to achieve the desired biasing of the free layer or the free layers.

DESCRIPTION OF THE PREFERRED EMBODIMENTS

Magnetic Disk Drive

Figures 1, 2:
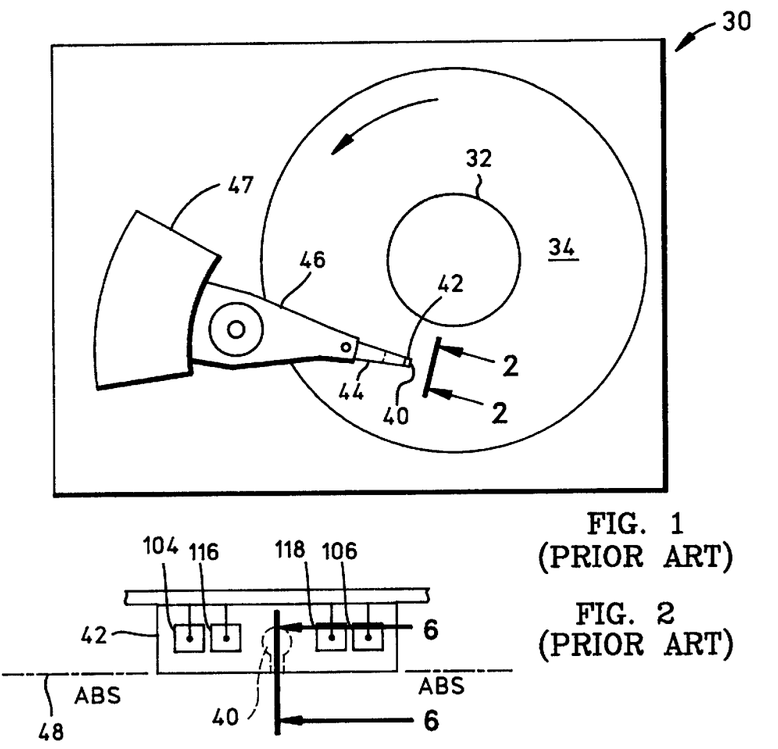
FIG. 1 is a plan view of an exemplary prior art magnetic disk drive.
FIG. 2 is an end view of a slider with a magnetic head of the disk drive as seen in plane 2—2 of FIG. 1.
Figure 3:
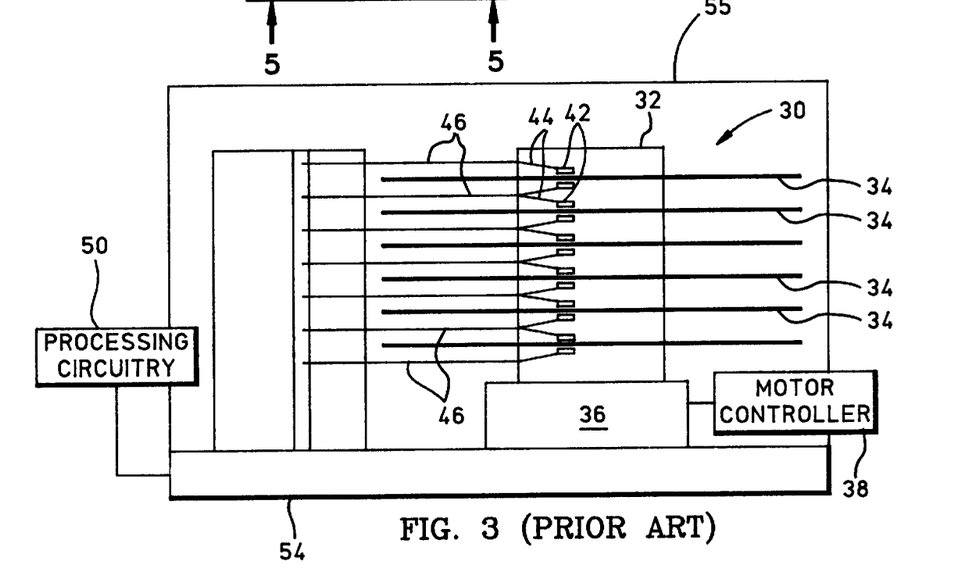
FIG. 3 is an elevation view of the magnetic disk drive wherein multiple disks and magnetic heads are employed.
Figure 4:
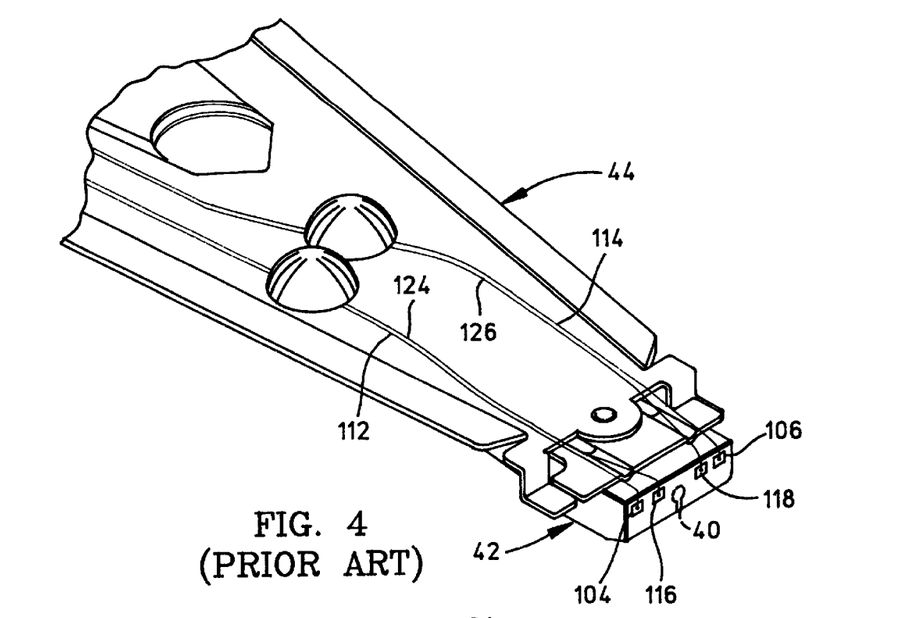
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
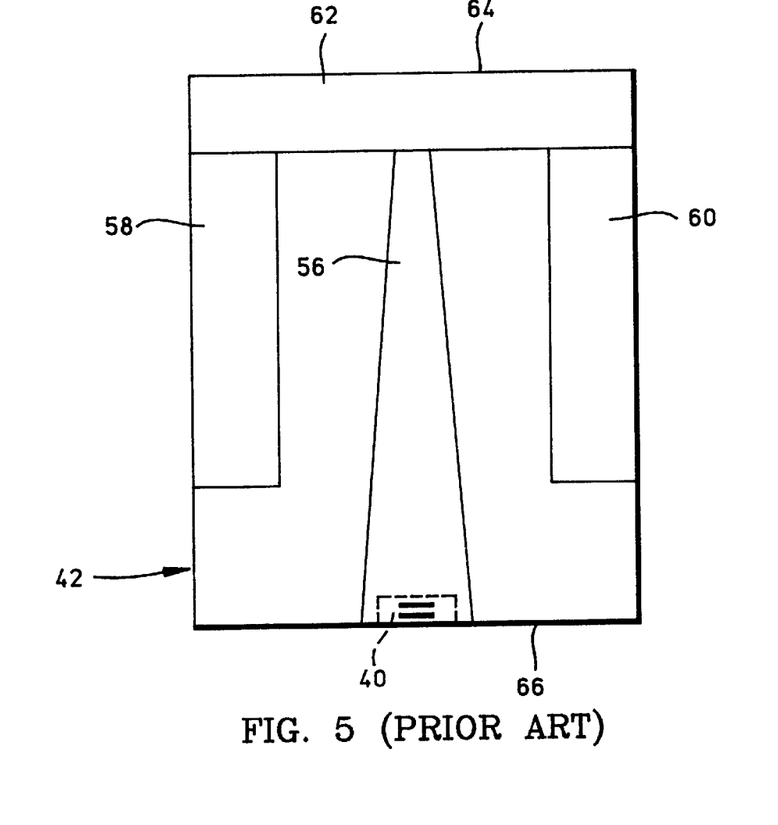
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figures 6, 7, 8:
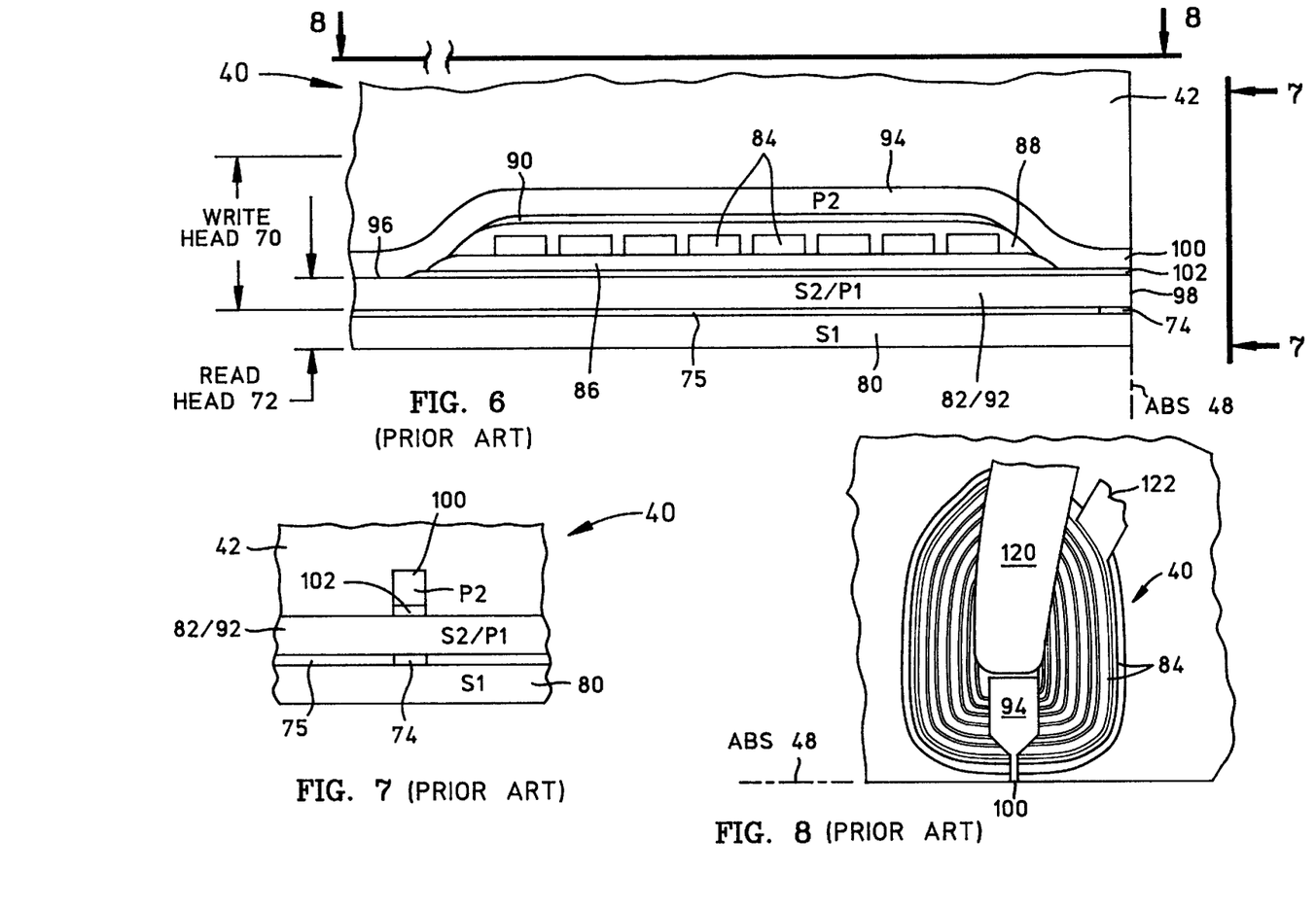
FIG. 6 is a partial view of the slider and a merged magnetic head as seen in plane 6—6 of FIG. 2.
FIG. 7 is a partial ABS view of the slider taken along plane 7—7 of FIG. 6 to show the read and write elements of the magnetic head.
FIG. 8 is a view taken along plane 8—8 of FIG. 6 with all material above the coil layer and leads removed.

FIG. 6 is a side cross-sectional elevation view of a merged magnetic head 40, which includes a write head portion 70 and a read head portion 72, the read head portion employing a CPP sensor 74. FIG. 7 is an ABS view of FIG. 6. The CPP sensor 74 is sandwiched between ferromagnetic first and second shield layers 80 (S1) and 82 (S2) which may serve as first and second leads connected to the processing circuitry 50 in FIG. 3 for conducting a current I through the sensor perpendicular to major planes of the layers of the sensor. About the sensor 74 a layer 75 insulates the first shield 80 from the second shield 82. In response to external magnetic fields, the resistance of the sensor 74 changes. When the current I is conducted through the sensor the resistance changes cause potential changes which are processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 (P1) and 94 (P2) The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
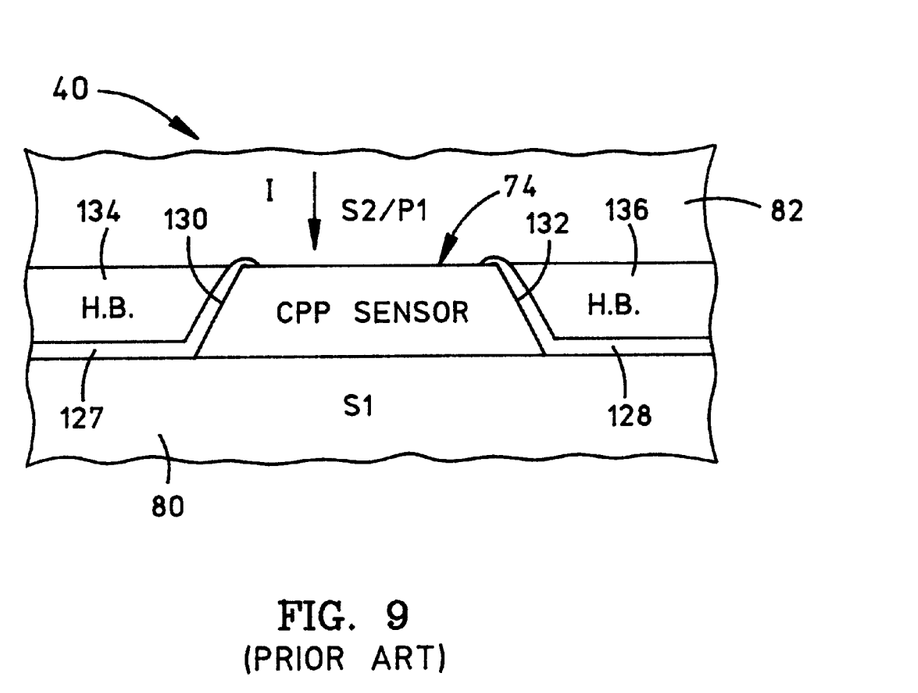
FIG. 9 is an enlarged isometric ABS illustration of a read head which has a CPP sensor.

FIG. 9 is an enlarged isometric ABS illustration of the prior art read head portion shown in FIG. 7. The read head includes the CPP sensor 74. First and second insulation layers 127 and 128, such as alumina ($Al_2O_3$), cover the first shield layer 80 on each side of the sensor 74 as well as slightly covering first and second side walls 130 and 132 of the sensor. First and second hard bias layers (H.B.) 134 and 136 are on the insulation layers 127 and 128 and are adjacent the side walls 130 and 132. The hard bias layers 134 and 136 cause magnetic fields to extend longitudinally through the sensor 74 for stabilizing the free layer. The sensor 74 and the first and second hard bias layers 134 and 136 are located between the ferromagnetic first and second shield layers 80 and 82 which may serve as leads for conducting the perpendicular current (I) through the sensor 74.

Unfortunately, the first and second hard bias layers 134 and 136 in FIG. 9 do not uniformly stabilize the free layer within the sensor 74. Hard bias layers typically stiffen the magnetic moment of the free layer at end portions of the sensor abutting the hard bias layers so that these portions are stiff in their response to field signals from the rotating magnetic disk. With submicron track widths, this loss, which can be 0.1 µm in width at each end of the sensor, is unacceptable. Further, a central portion of the free layer may not be properly stabilized since magnetic flux is progressively drawn in by the first and second shield layers 80 and 82 as the flux lines from the hard bias layers extend between the side walls 130 and 132.

The Invention

Figure 10:
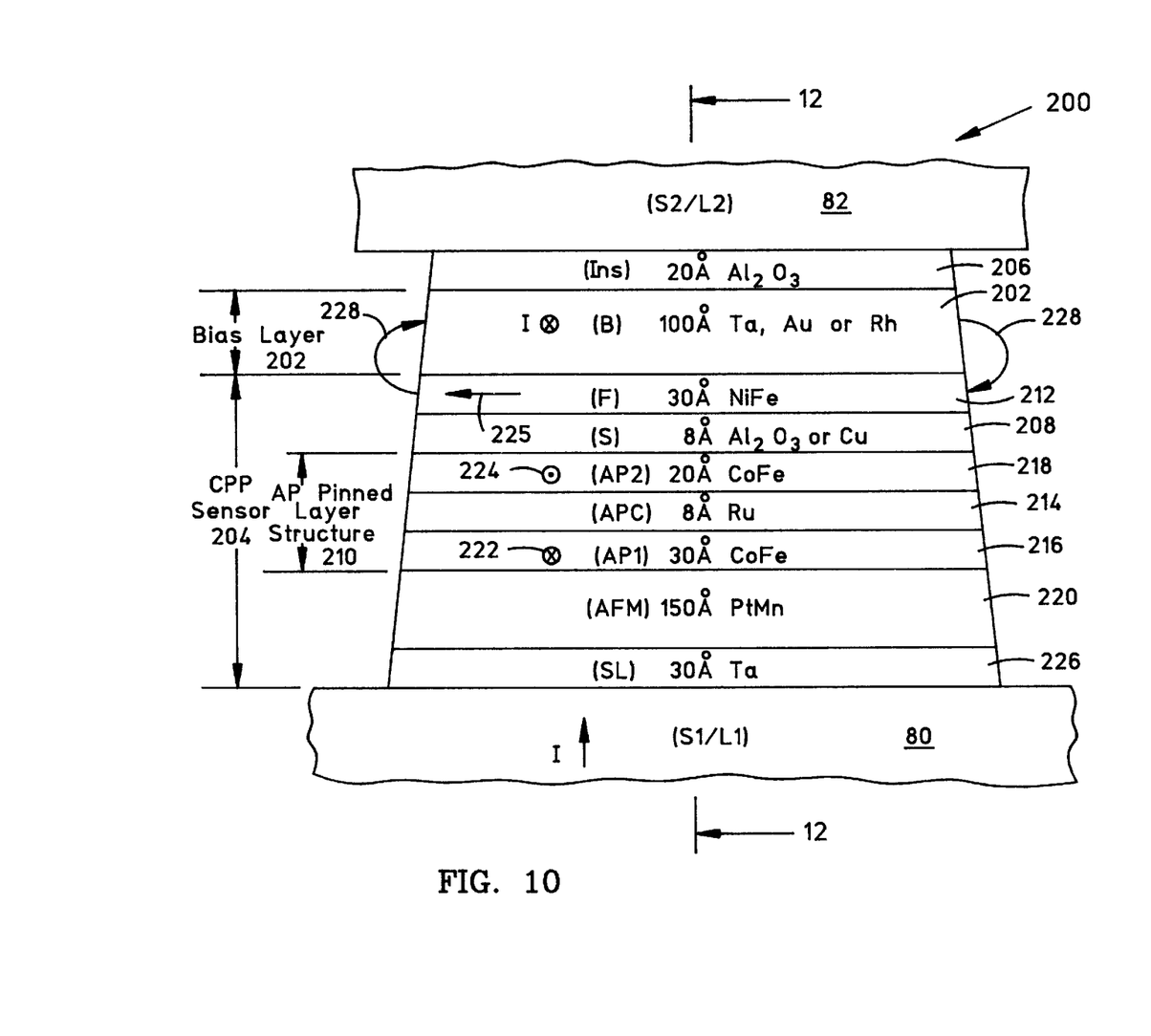
FIG. 10 is an ABS illustration of a first embodiment of the present CPP sensor.

One embodiment of the present magnetic read head assembly 200 includes a nonmagnetic electrically conductive bias layer (B) 202 which is located between a current perpendicular to the planes (CPP) sensor 204 and an insulation layer (Ins) 206. The bias layer 202, the CPP sensor 204 and the insulation layer 206 are located between the first and second shield layers (S1) and (S2) 80 and 82 with the insulation layer 206 insulating the bias layer 202 from the shield layer 82. The CPP sensor 204 includes a spacer layer (S) 208 which is located between an AP pinned layer structure 210 and a free layer 212(F). The AP pinned layer structure 210 includes a nonmagnetic electrically conductive antiparallel coupling layer (APC) 214 which is located between first and second AP pinned layers (AP1) and (AP2) 216 and 218. An antiferromagnetic (AFM) pinning layer 220 may be exchange coupled to the first AP pinned layer 216 for pinning a magnetic moment 222 of the first AP pinned layer in a direction either out of the head or into the head, as shown in FIG. 10. By a strong antiparallel coupling between the magnetic moment 222 and a magnetic moment 224 of the second AP pinned layer the direction of the magnetic moment 224 is antiparallel to the magnetic moment 222. A seed layer (SL) 226 may be located between the first shield layer 80 and the pinning 220 for promoting a desirable texture of the layers deposited thereon.

The free layer 212 has a magnetic moment 225 which may be directed from right to left or from left to right, as shown in FIG. 10. When a field signal from a rotating magnetic disk rotates the magnetic moment 225 into the head the magnetic moments 224 and 225 become more antiparallel which increases the resistance of the head to the current (I) and when the field signal rotates the magnetic moment 225 out of the head the magnetic moments 224 and 225 become more parallel which decreases the resistance of the sensor. The resistance changes cause potential changes within the processing circuitry 50 in FIG. 3 which are processed as playback signals.

Exemplary materials and thicknesses of the layers are 30 Å of tantalum (Ta) for the seed layer 226, 150 Å of platinum manganese (PtMn) for the pinning layer 220, 30 Å of cobalt iron (CoFe) for the first AP pinned layer 216, 8 Å of ruthenium (Ru) for the antiparallel coupling layer 214, 20 Å of cobalt iron (CoFe) for the second AP pinned layer 218, 8

Å of aluminum oxide ($Al_2O_3$) or copper (Cu) for the spacer layer 208, 30 Å of nickel iron (NiFe) for the free layer 212, 100 Å of tantalum (Ta), gold (Au), rhodium (Rh) or copper (Cu) for the bias layer 202 and 20 Å of aluminum oxide ($Al_2O_3$) for the insulation layer 206. The bias layer 202 preferably interfaces the free layer 212 so that a field 228 from the bias layer effectively longitudinally biases the free layer 212 which will be described in more detail hereinafter.

Figure 12:
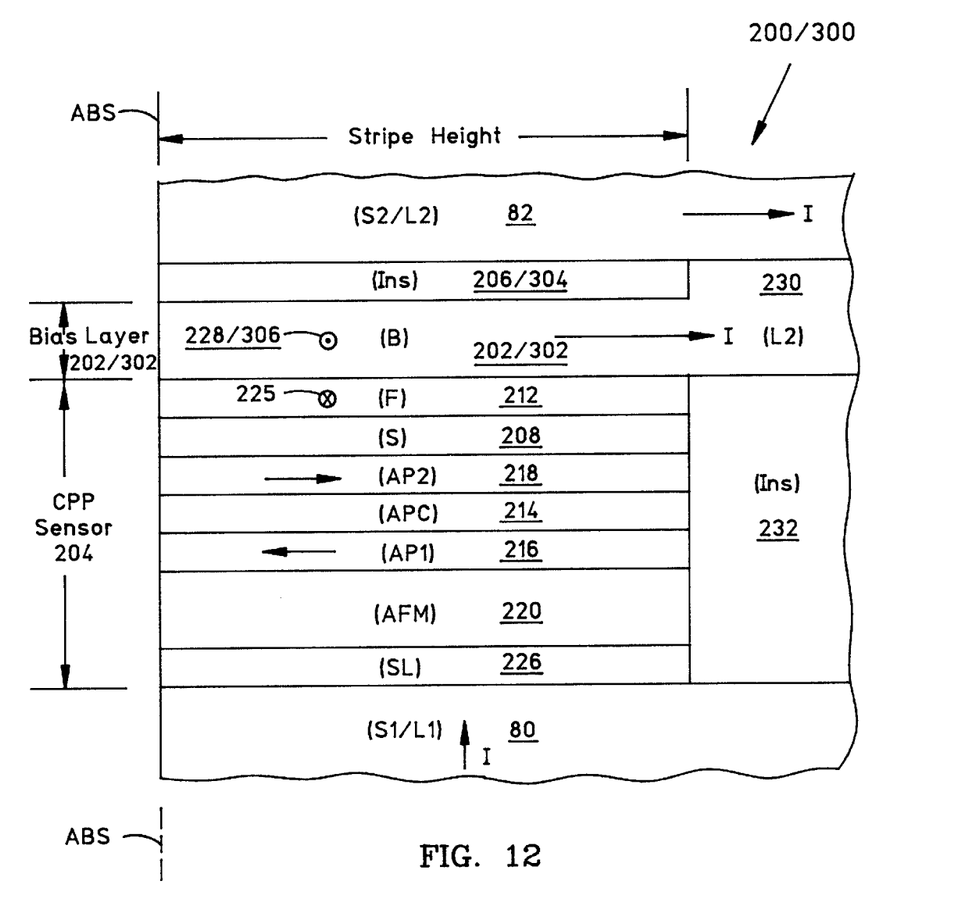
FIG. 12 is a view taken along plane 12—12 of FIGS. 10 and 11.

As shown in FIGS. 10 and 12 the layers of the CPP sensor 204 and the bias layer 202 have major thin film planes which are shown by the horizontal lines which bound these layers in these figures. Further, FIG. 12 shows the read head as having a stripe height which extends from the ABS in a direction normal thereto to a recessed location within the head. The first shield layer 80 may also serve as a first lead layer (S1/L1) for conducting a current (I) through the CPP sensor 204 perpendicular to the major thin film planes of the sensor. As shown in FIG. 12, a second lead layer (L2) 230 extends from the stripe height further into the head. The first and second lead layers 80 and 230 are connected to the processing circuitry 50 in FIG. 3 where the current (I) is generated and potential changes are detected and processed as playback signals. The bias layer 202 is connected to the second lead layer 230 at the stripe height. Alternatively, the bias layer 202 and the second lead 230 may be considered as a single conductor which extends from the ABS to the processing circuitry. Still further, the second lead 230 may be a short conductor which interfaces the second shield layer 82 behind the stripe height so that the second shield layer can serve as the second lead (S2/L2) with the second shield/second lead (S2/L2) extending to the processing circuitry. It should be noted that the insulation layer 206 insulates the bias layer 202 from the second shield/second lead (S2/L2) and an insulation layer 232 insulates the second lead (L2) 230 from the first shield/first lead (S1/L1).

Accordingly, the first shield/first lead (S1/L1) conducts the current (I) through the CPP sensor 204 perpendicular to the major thin film planes of the layers of the sensor to the bias layer 202 wherein the current (I) is then conducted perpendicular to the ABS by the bias layer to the second lead (L2). The direction of the current (I) in the bias layer 202 causes the aforementioned field 228, which is exerted by the bias layer on the free layer. This field longitudinally biases the free layer in the direction of the magnetic moment of the free layer so as to stabilize the magnetism of the free layer in a single domain state. This is a closed flux condition which uniformly biases the free layer along its width so that the track width of the read head at the free layer is the width of the free layer shown in FIG. 10 instead of a diminished track width when the prior art hard bias layers are used for stabilizing the free layer.

Figure 11:
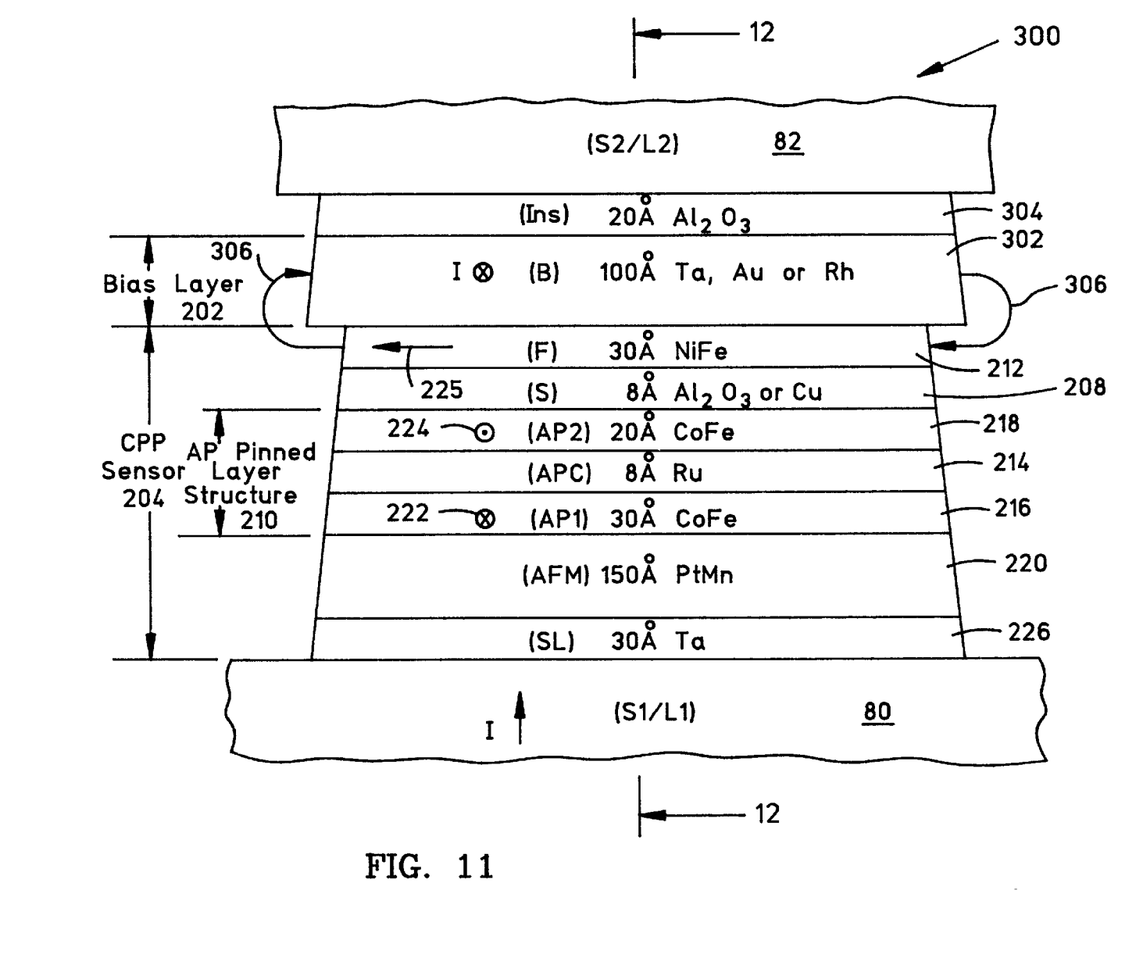
FIG. 11 is an ABS illustration of a second embodiment of the present CPP sensor.

In FIG. 10 the width of the bias layer 202 is substantially the same width as the free layer 212 which results in the field 228 from the bias layer acting on the free layer. In FIG. 11 another embodiment 300 of the present read head assembly is shown wherein the bias layer 302 and the insulation layer 304 have widths which are greater than the free layer 212. This causes a field 306 from the bias layer 302 on the free layer 212 which is less than the field 228 in FIG. 10. The reason for this is because the side surfaces of the bias layer 302 are farther away from the side surfaces of the free layer 212 than that shown in FIG. 10. Accordingly, the width of the bias layer can be sized in width so as to provide a desired longitudinal biasing of the free layer 212. If less biasing is desired the width of the bias layer is simply increased, as shown in FIG. 11.

The CPP sensor in either FIG. 10 or FIG. 11 may be either a magnetic tunnel junction (MTJ) sensor or a CPP spin valve sensor. If the CPP sensor is a MTJ sensor the spacer layer is a non-oxide metal, such as copper (Cu), and if the CPP sensor is a CPP spin valve sensor the spacer layer 208 is a nonconductive metallic oxide, such as aluminum oxide ($Al_2O_3$).

Figure 13:
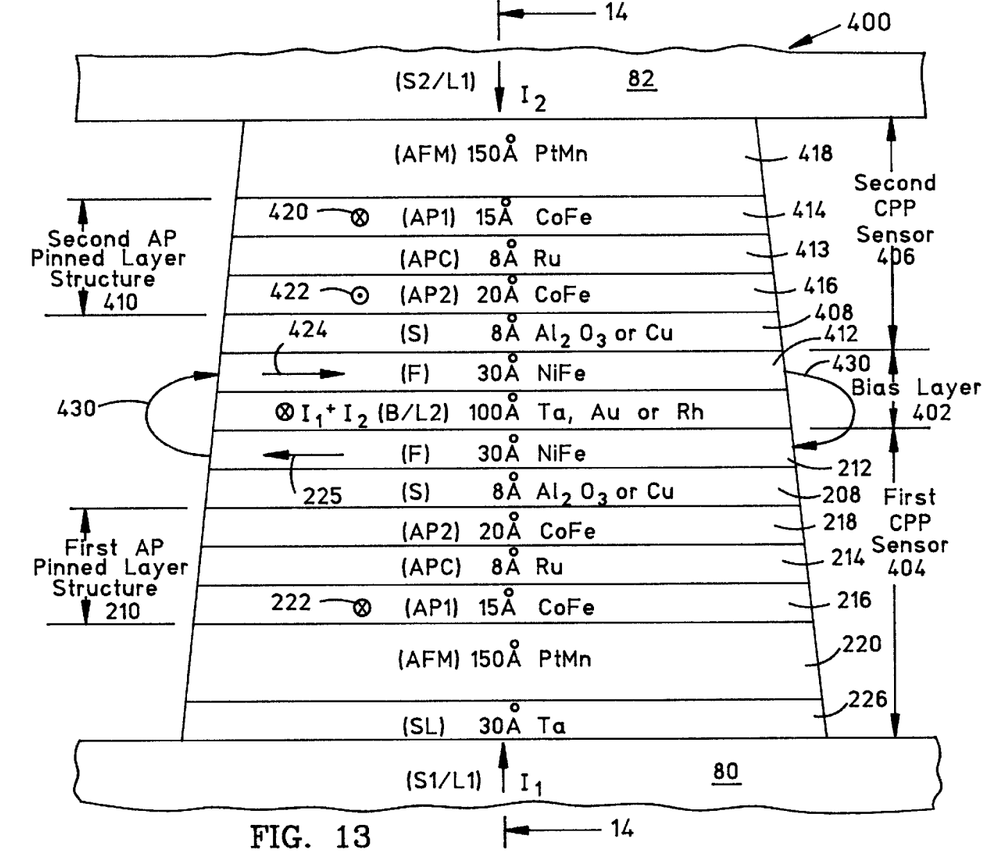
FIG. 13 is an ABS illustration of a third embodiment which employs a pair of CPP sensors.
Figure 14:
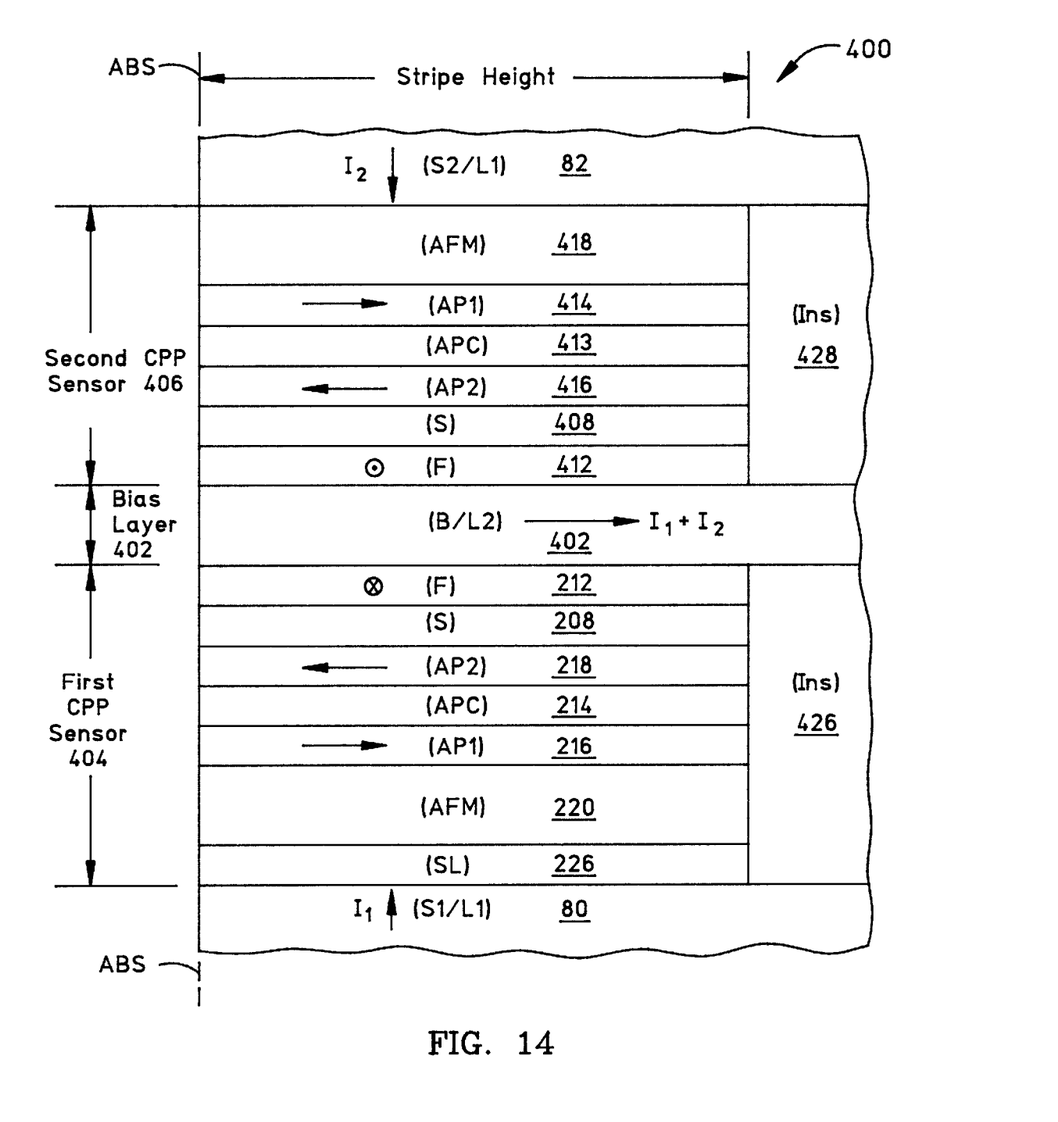
FIG. 14 is a view taken along plane 14—14 of FIG. 13.

A preferred embodiment 400 of the present magnetic read head assembly, shown in FIGS. 13 and 14, includes a bias layer (B) 402 which is located between first and second CPP sensors 404 and 406. The first CPP sensor 404 may be essentially the same as the CPP sensor 204 in FIG. 10 and is therefore given the same reference numerals as shown in FIG. 10. The second CPP sensor 406 is essentially the same as the first CPP sensor 404 except the layers are in a reverse order. The second CPP sensor 406 includes a spacer layer (S) 408 which is located between a second AP pinned layer structure 410 and a free layer 412(F). The second AP pinned layer structure 410 includes an antiparallel coupling layer (APC) 413 which is located between first and second AP pinned layers (AP1) and (AP2) 414 and 416. A pinning layer 418 is exchange coupled to the first AP pinned layer 414 for orienting a magnetic moment 420 of the first AP pinned layer into the head assembly. By strong antiparallel coupling between the magnetic moment 420 and the magnetic moment 422 of the second AP pinned layer 416 the magnetic moments 420 and 422 are antiparallel with respect to one another. The free layer 412 has a magnetic moment 424 which is directed from left to right.

When a signal field rotates the magnetic moment 424 into the head the magnetic moments 424 and 422 become more antiparallel which increases the resistance of the head and when the signal field rotates the magnetic moment 424 out of the head the magnetic moments 422 and 424 become more parallel which decreases the resistance of the head. It should be noted that the same operation applies to the first CPP sensor 404, as described for the embodiment shown in FIG. 10, and that the signal fields acting on the magnetic moments 225 and 424 of the free layers combine together to either increase or decrease the resistance of the sensor. This operation provides a significantly stronger signal than that obtained from the embodiment shown in FIG. 10. The thicknesses of materials of the layers of the first and second CPP sensors 404 and 406 and the bias layer 402 may be essentially the same as that described hereinabove for the layers described for the FIG. 10 embodiment. The bias layer 402 preferably interfaces both of the free layers 212 and 412.

Again, the first shield layer 80 may also serve as the first lead layer (S1/L1) for conducting a current I1 through the first CPP sensor 404 perpendicular to the major thin film planes of the layers of the sensor to the bias layer 402. The second shield layer 82 may also serve as a first lead (S2/L1) for conducting a current $I_2$ through the second CPP sensor 406 perpendicular to the major thin film planes of the layers of the sensor to the bias layer 402. At a location recessed within the head (not shown) the first shield/first lead layer (S1/L1) and the second shield/first lead layer (S2/L1) may be joined to continue the first lead to the processing circuitry, as described hereinabove. As shown in FIGS. 13 and 14, the bias layer 402 may serve as the second lead (B/L2) which extends from the ABS to the processing circuitry (not shown). The bias second lead layer (B/L2) 402 is insulated from the first and second shield layers by insulation layers (Ins) 426 and 428.

When the currents $I_1/I_2$ are conducted to the bias second lead layer (B/L2) the current then becomes $I_1$ plus $I_2$ which is conducted perpendicular to the ABS through the bias second lead layer (B/L2) into the head and to the processing circuitry. This causes a field 430 which is conducted through the free layers 212 and 412 in the direction of the magnetic moments 225 and 424 to longitudinally stabilize the free layers 212 and 412, as discussed hereinabove. An additional advantage of the embodiment 400, however, is that the magnetic moments 225 and 424 are antiparallel with respect to one another which promotes a highly desirable longitudinal stabilization of the free layers 212 and 412. Again, the first and second CPP sensors 404 and 406 may be either a MTJ sensor or a CPP spin valve sensor, as discussed hereinabove, depending upon the materials of the spacer layers 208 and 408.

Discussion

It should be noted that the CPP sensor 204 in FIG. 10 and the first CPP sensor 404 in FIG. 13 are bottom spin valve sensors while the second CPP sensor 406 in FIG. 13 is a top spin valve sensor. It should be understood that the order of the layers may be reversed so that the CPP sensor 204 in FIG. 10 and the CPP sensor 404 in FIG. 13 are top spin valve sensors while the second CPP sensor 406 in FIG. 13 is a bottom spin valve sensor without departing from the spirit of the invention. Further, the magnetic moments may be reversed in their directions in the CPP sensors in FIGS. 10 and 13. Still further, the AP pinned layer structures shown in FIGS. 10 and 13 may be a single pinned layer which is pinned by the AFM pinning layers.

The invention may employ an AP pinned layer structure with an AFM pinning layer pinning one of the AP pinned layers of the AP pinned layer structure as shown in FIGS. 10, 11 and 13 or a self-pinning antiparallel (AP) pinned layer structure without an AFM pinning layer pinning the AP pinned layer structure may be employed. The self-pinning is accomplished by uniaxial anisotropies of the AP pinned layers which are oriented perpendicular to the ABS and, in combination, self-pin the magnetic moments of the first and second AP pinned layers perpendicular to the ABS and antiparallel with respect to each other. Commonly assigned U.S. Pat. No. 6,127,053 is incorporated in its entirety regarding self-pinned AP pinned layer structures.

Clearly, other embodiments and modifications of this invention will occur readily to those of ordinary skill in the art in view of these teachings. For instance, the slider supporting the sensor may have a head surface other than the aforementioned ABS, such as a tape surface for use in a tape drive. Therefore, this invention is to be limited only by the following claims, which include all such embodiments and modifications when viewed in conjunction with the above specification and accompanying drawings.

I claim:

1. A magnetic head assembly having a head surface for facing a magnetic medium comprising:

first and second CPP sensors;

each CPP sensor including a ferromagnetic free layer which has a magnetic moment that is oriented substantially parallel to the head surface and is free to rotate in response to a signal field from a magnetic medium;

each free layer having major planes that are perpendicular to the head surface and a stripe height that extends normal to said head surface into the magnetic head assembly;

a nonmagnetic electrically conductive bias layer located between the first and second CPP sensors with major planes parallel to the major planes of the free layers and extending in a direction away from the head surface into the head assembly beyond the stripe heights;

ferromagnetic first and second shield layers;

the first and second CPP sensors and the bias layer being located between the first and second shield layers;

the first and second shield layers being electrically connected to the first and second CPP sensors respectively for conducting first and second currents respectively through the first and second CPP sensors perpendicular to the major planes of the free layers to the bias layer; and the bias layer being electrically connected to the first and second CPP sensors and sized so that the first and second currents can flow through the bias layer perpendicular to the head surface to cause a biasing field that biases the magnetic moments of the free layers antiparallel with respect to one another.

2. A magnetic head assembly as claimed in claim 1 wherein one of the first and second shield layers is also said first lead.

3. A magnetic head assembly as claimed in claim 2 including:

the other of said first and second shield layers also being said second lead; and an insulation layer insulating the bias layer from said other of the first and second shield layers in a region defined by said stripe height.

4. A magnetic head assembly as claimed in claim 3 including:

each CPP sensor including a nonmagnetic spacer layer and a ferromagnetic pinned layer with the spacer layer located between the free layer and the pinned layer; and the bias layer being located between and interfacing the free layers of the first and second CPP sensors.

5. A magnetic head assembly as claimed in claim 4 wherein the spacer layer is a barrier layer that is composed of an electrically nonconductive metallic oxide.

6. A magnetic head assembly as claimed in claim 4 wherein the spacer layer is an electrically conductive layer composed of a non-oxide metal.

7. A magnetic head assembly as claimed in claim 4 wherein the bias layer has a width at the head surface that is substantially equal to the width of said layers of the first and second CPP sensors at the head surface.

8. A method of making a magnetic head assembly having a head surface for facing a magnetic medium comprising the steps of:

forming first and second CPP sensors;

forming each CPP sensor with a ferromagnetic free layer which has a magnetic moment that is oriented substantially parallel to the head surface and is free to rotate in response to a signal field from a magnetic medium;

forming each free layer with major planes that are perpendicular to the head surface and a stripe height that extends normal to said head surface into the magnetic head assembly;

forming a nonmagnetic electrically conductive bias layer between the first and second CPP sensors with major planes parallel to the major planes of the free layers and extending in a direction away from the head surface into the head assembly beyond the stripe heights;

forming ferromagnetic first and second shield layers;

locating the first and second CPP sensors and the bias layer between the first and second shield layers;

electrically connecting the first and second shield layers to the first and second CPP sensors respectively for conducting first and second currents respectively through the first and second CPP sensors perpendicular to the major planes of the free layers to the bias layer; and electrically connecting the bias layer to the first and second CPP sensors and sizing it so that the first and second currents can flow through the bias layer perpendicular to the head surface to cause a biasing field that biases the magnetic moments of the free layers antiparallel with respect to one another.

9. A method as claimed in claim 8 wherein one of the first and second shield layers is also formed as said first lead.

10. A method as claimed in claim 9 including the steps of:
forming the other of said first and second shield layers as said second lead; and
forming an insulation layer insulating the bias layer from said other of the first and second shield layers in a region defined by said stripe height.

11. A method as claimed in claim 10 including the steps of:
forming each CPP sensor with a nonmagnetic spacer layer and a ferromagnetic pinned layer with the spacer layer located between the free layer and the pinned layer; and
locating the bias layer between and interfacing the free layers of the first and second CPP sensors.

12. A method as claimed in claim 11 wherein the spacer layer is formed as a barrier layer that is composed of an electrically nonconductive metallic oxide.

13. A method as claimed in claim 11 wherein the spacer layer is formed as an electrically conductive layer composed of a non-oxide metal.

14. A method as claimed in claim 11 wherein the bias layer is formed with a width at the head surface that is substantially equal to the width of said layers of the first and second CPP sensors at the head surface.

15. A magnetic disk drive including at least one magnetic head assembly that has a head surface for facing a moving magnetic medium wherein the magnetic head assembly includes a write head and a read head, comprising:
the write head;
the read head including:
first and second CPP sensors;
each CPP sensor including a ferromagnetic free layer which has a magnetic moment that is oriented substantially parallel to the head surface and is free to rotate in response to a signal field from the magnetic medium;
each free layer having major planes that are perpendicular to the head surface and a stripe height that extends normal to said head surface into the magnetic head assembly;
a nonmagnetic electrically conductive bias layer located between the first and second CPP sensors with major planes parallel to the major planes of the free layers and extending in a direction away from the head surface into the head assembly beyond the stripe heights;
ferromagnetic first and second shield layers;
the first and second CPP sensors and the bias layer being located between the first and second shield layers;
the first and second shield layers being electrically connected to the first and second CPP sensors respectively for conducting first and second currents respectively through the first and second CPP sensors perpendicular to the major planes of the free layers to the bias layer; and
the bias layer being electrically connected to the first and second CPP sensors and sized so that the first and second currents can flow through the bias layer perpendicular to the head surface to cause a biasing field that biases the magnetic moments of the free layers antiparallel with respect to one another;
a housing;
the magnetic medium wherein the magnetic medium is supported in the housing;
a support mounted in the housing for supporting the magnetic head assembly with said head surface facing the magnetic medium so that the magnetic head assembly is in a transducing relationship with the magnetic medium;
means for moving the magnetic medium; and
a processor connected to the magnetic head assembly and to the means for moving, for exchanging signals with the magnetic head assembly and for controlling movement of the magnetic medium.

16. A magnetic disk drive as claimed in claim 15 wherein one of the first and second shield layers is also said first lead.

17. A magnetic disk drive as claimed in claim 16 including:
the other of said first and second shield layers also being said second lead; and
an insulation layer insulating the bias layer from said other of the first and second shield layers in a region defined by said stripe height.

18. A magnetic disk drive as claimed in claim 17 including:
each CPP sensor including a nonmagnetic spacer layer and a ferromagnetic pinned layer with the spacer layer located between the free layer and the pinned layer; and
the bias layer being located between and interfacing the free layers of the first and second CPP sensors.

19. A magnetic disk drive as claimed in claim 18 wherein the spacer layer is a barrier layer that is composed of an electrically nonconductive metallic oxide.

20. A magnetic disk drive as claimed in claim 18 wherein the spacer layer is an electrically conductive layer composed of a non-oxide metal.

21. A magnetic disk drive as claimed in claim 18 wherein the bias layer has a width at the head surface that is substantially equal to the width of said layers of the first and second CPP sensors at the head surface.

* * * * *